(12) United States Patent
Vandeven et al.

(10) Patent No.: US 10,433,486 B2
(45) Date of Patent: Oct. 8, 2019

(54) SYSTEM AND METHOD FOR WING FLOAT ON A COMBINE DRAPER HEADER

(71) Applicant: Deere & Company, Moline, IL (US)

(72) Inventors: Michael L. Vandeven, Princeton, IA (US); Joshua R. Pierson, Davenport, IA (US); Alex Brimeyer, Bettendorf, IA (US); Peter T. Swanson, Dallas Center, IA (US)

(73) Assignee: DEERE & COMPANY, Moline, IL (US)

( * ) Notice: Subject to any disclaimer, the term of this patent is extended or adjusted under 35 U.S.C. 154(b) by 130 days.

(21) Appl. No.: 15/785,092

(22) Filed: Oct. 16, 2017

(65) Prior Publication Data

US 2019/0110402 A1    Apr. 18, 2019

(51) Int. Cl.
*A01D 61/00* (2006.01)
*A01D 41/14* (2006.01)
(Continued)

(52) U.S. Cl.
CPC .......... *A01D 61/002* (2013.01); *A01D 41/14* (2013.01); *A01D 41/144* (2013.01); *A01D 57/20* (2013.01);
(Continued)

(58) Field of Classification Search
CPC .... A01D 61/002; A01D 61/008; A01D 61/02; A01D 34/04; A01D 57/20; A01D 41/14; A01D 41/144
See application file for complete search history.

(56) References Cited

U.S. PATENT DOCUMENTS 2,608,041 A   8/1952   Schoenrock
3,468,107 A   9/1969   Van der Lely
(Continued)

FOREIGN PATENT DOCUMENTS

EP   0750833       1/1997
EP   2842407 A1   3/2015
(Continued)

OTHER PUBLICATIONS

United States Patent Office Action for U.S. Appl. No. 15/730,442 dated Dec. 20, 2018 (18 pages).
(Continued)

*Primary Examiner* — Robert E Pezzuto
*Assistant Examiner* — Adam J Behrens
(74) *Attorney, Agent, or Firm* — Michael Best & Friedrich LLP

(57) ABSTRACT

A combine draper header and method of floating a wing of the same from a center section of the draper header. The wing is movably supported with respect to the center section to enable movement of the wing between a first position and a second position. The wing is supported with respect to the center section with a resilient float element. Increasing amounts of energy are stored in the resilient float element through movement of the wing from the first position to the second position. The resilient float element is re-oriented with a float linkage to reduce the mechanical advantage of the resilient float element for supporting the wing through movement of the wing from the first position to the second position, thus buffering the wing from a force increase from the resilient float element.

20 Claims, 5 Drawing Sheets

(51) Int. Cl.
*A01D 57/20* (2006.01)
*A01D 61/02* (2006.01)
*A01D 34/04* (2006.01)

(52) U.S. Cl.
CPC ............ *A01D 61/008* (2013.01); *A01D 61/02* (2013.01); *A01D 34/04* (2013.01)

(56) References Cited

U.S. PATENT DOCUMENTS

| | | | |
|---|---|---|---|
| 3,683,601 A | | 8/1972 | Van der Lely |
| 4,487,004 A | * | 12/1984 | Kejr ................ A01D 41/14 56/14.4 |
| 5,464,371 A | | 11/1995 | Honey |
| 5,577,563 A | | 11/1996 | Holen |
| 5,673,543 A | | 10/1997 | Richardson et al. |
| 5,724,798 A | | 3/1998 | Stefl et al. |
| 5,845,472 A | | 12/1998 | Arnold |
| 6,003,615 A | | 12/1999 | Moore |
| 6,202,397 B1 | | 3/2001 | Watts et al. |
| 6,675,568 B2 | * | 1/2004 | Patterson ............ A01D 41/14 56/208 |
| 6,865,871 B2 | | 3/2005 | Patterson et al. |
| 7,168,226 B2 | | 1/2007 | McLean et al. |
| 7,470,180 B2 | | 12/2008 | Honey |
| 7,540,130 B2 | | 6/2009 | Coers et al. |
| 7,587,885 B2 | | 9/2009 | Tippery et al. |
| 7,802,417 B2 | | 9/2010 | Sauerwein et al. |
| 7,918,076 B2 | * | 4/2011 | Talbot ................ A01D 41/14 56/208 |
| 7,992,372 B1 | * | 8/2011 | Coers ................ A01D 41/14 56/153 |
| 8,087,224 B1 | | 1/2012 | Coers et al. |
| 8,281,561 B2 | | 10/2012 | Dow et al. |
| 8,336,280 B2 | | 12/2012 | Lovett et al. |
| 8,393,135 B2 | | 3/2013 | Honas et al. |
| 8,544,250 B2 | | 10/2013 | Lovett et al. |
| 9,072,222 B2 | | 7/2015 | Bomleny et al. |
| 9,144,199 B2 | | 9/2015 | Ritter et al. |
| 9,161,492 B2 | | 10/2015 | Fuechtling |
| 9,198,353 B2 | * | 12/2015 | Ritter ................ A01D 45/025 |
| 9,526,206 B2 | | 12/2016 | Schulze Ruckamp et al. |
| 9,992,924 B2 | * | 6/2018 | van Vooren ........ A01D 41/144 |
| 10,070,575 B2 | * | 9/2018 | Wenger ................ A01B 73/065 |
| 10,299,437 B2 | | 5/2019 | Farley et al. |
| 2002/0035826 A1 | | 3/2002 | Albinger et al. |
| 2003/0074876 A1 | | 4/2003 | Patterson et al. |
| 2003/0182912 A1 | | 10/2003 | Boll |
| 2003/0226342 A1 | | 12/2003 | Boeckmann et al. |
| 2004/0123575 A1 | | 7/2004 | Rickert |
| 2005/0284124 A1 | | 12/2005 | Patterson et al. |
| 2006/0225900 A1 | | 10/2006 | Kimball |
| 2008/0072560 A1 | | 3/2008 | Talbot |
| 2008/0161077 A1 | | 7/2008 | Honey |
| 2008/0295473 A1 | | 12/2008 | Tippery et al. |
| 2009/0320431 A1 | | 12/2009 | Puryk et al. |
| 2012/0047866 A1 | | 3/2012 | Fuechtling |
| 2012/0279191 A1 | | 11/2012 | Sauerwein et al. |
| 2013/0097986 A1 | | 4/2013 | Lovett et al. |
| 2014/0033670 A1 | | 2/2014 | Cressoni |
| 2014/0041354 A1 | | 2/2014 | Coon et al. |
| 2015/0013795 A1 | | 1/2015 | Ritter et al. |
| 2015/0373907 A1 | | 12/2015 | Schulze Ruckamp et al. |
| 2016/0183462 A1 | | 6/2016 | Magisson et al. |
| 2016/0262301 A1 | | 9/2016 | van Vooren et al. |
| 2016/0360699 A1 | | 12/2016 | Allochis |
| 2017/0094904 A1 | | 4/2017 | Sudhues et al. |
| 2017/0113876 A1 | | 4/2017 | Jager et al. |
| 2017/0223896 A1 | | 8/2017 | Schmid |
| 2017/0251606 A1 | | 9/2017 | Van Overschelde et al. |
| 2017/0367266 A1 | | 12/2017 | Vandendriessche et al. |
| 2018/0035598 A1 | | 2/2018 | Wenger et al. |
| 2018/0070526 A1 | | 3/2018 | Henry |
| 2018/0084724 A1 | | 3/2018 | Fuchtling |
| 2018/0338418 A1 | | 11/2018 | Ricketts et al. |
| 2019/0045709 A1 | | 2/2019 | Schroeder et al. |
| 2019/0053429 A1 | * | 2/2019 | Cook ................ A01D 45/021 |

FOREIGN PATENT DOCUMENTS

| | | |
|---|---|---|
| EP | 3066910 A1 | 9/2016 |
| EP | 3087819 A2 | 11/2016 |

OTHER PUBLICATIONS

European Patent Office Search Report for Application No. 18200409.3 dated Mar. 15, 2019 (7 pages).

European Patent Office Search Report for Application No. 18200436.6 dated Mar. 19, 2019 (9 pages).

European Patent Office Search Report for Application No. 18199247.0 dated Mar. 22, 2019 (7 pages).

United States Patent Office Action for U.S. Appl. No. 15/729,867 dated May 8, 2019 (13 pages).

European Patent Office Search Report for Application No. 18199265.2 dated May 17, 2019 (12 pages).

United States Patent Office Action for U.S. Appl. No. 15/785,831 dated Jul. 3, 2019 (10 pages).

* cited by examiner

SYSTEM AND METHOD FOR WING FLOAT ON A COMBINE DRAPER HEADER

BACKGROUND

The disclosure relates to headers for combine harvesters, and more particularly draper headers having separate lateral wings for ground following and draper belts for feeding cut crops into a feeder house.

SUMMARY

The disclosure provides, in one aspect, a draper header for a combine. A center section is adapted for attachment to the combine and is provided with a belt operable in a rearward direction for feeding crop material into the combine. First and second wings extend in opposite lateral directions from the center section. Each of the first and second wings includes a draper belt operable to feed crop material toward the center section. The first and second wings are individually pivotably supported relative to the center section. A cutterbar is positioned at a forward edge of the draper header across the center section and the first and second wings and is operable to reciprocate for cutting crop material from the ground. The first and second wings are coupled to the center section by respective connection linkages and are furthermore supported relative to the center section by respective resilient float element. Each resilient float element is operable to produce a force output that varies with a position of the wing with respect to the center section. Each resilient float element is coupled between the center section and the respective one of the first and second wings by a respective float linkage operable through a range of positions to vary a mechanical advantage between the resilient float element and the respective wing. The movement of the float linkage reduces the mechanical advantage as the force output in the corresponding resilient float element increases, and the movement of the float linkage increases the mechanical advantage as the force output in the corresponding resilient float element decreases so that change of an overall wing float force applied to the wing by the resilient float element is subdued.

The disclosure provides, in another aspect, a draper header for a combine including a center section, wings, a cutterbar, and resilient float elements. The center section is adapted for attachment to the combine and is provided with a belt operable in a rearward direction for feeding crop material into the combine. First and second wings extend in opposite lateral directions from the center section, and each of the first and second wings includes a draper belt operable to feed crop material toward the center section. The first and second wings are individually pivotably supported relative to the center section. The cutterbar is positioned at a forward edge of the draper header across the center section and the first and second wings, and the cutterbar is operable to reciprocate for cutting crop material from the ground. The first resilient float element is operable to produce a force output from stored energy therein that is applied through a first float linkage to provide an overall float force to the first wing. The second resilient float element is operable to produce a force output from stored energy therein that is applied through a second float linkage to provide an overall float force to the second wing. The first float linkage is operable through a range of positions to alter a mechanical advantage between the first resilient float element and the first wing inversely with a change in the force output from the first resilient float element as the first wing moves with respect to the center section. The second float linkage is operable through a range of positions to alter a mechanical advantage between the second resilient float element and the second wing inversely with a change in the force output from the second resilient float element as the second wing moves with respect to the center section.

The disclosure provides, in yet another aspect, a method of floating a wing of a combine draper header from a center section of the draper header. The wing is movably supported with respect to the center section to enable movement of the wing between a first position and a second position. The wing is supported with respect to the center section with a resilient float element. Increasing amounts of energy are stored in the resilient float element through movement of the wing from the first position to the second position. The resilient float element is re-oriented with a float linkage to reduce the mechanical advantage of the resilient float element for supporting the wing through movement of the wing from the first position to the second position, thus buffering the wing from a force increase from the resilient float element.

Further aspects are set forth in the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
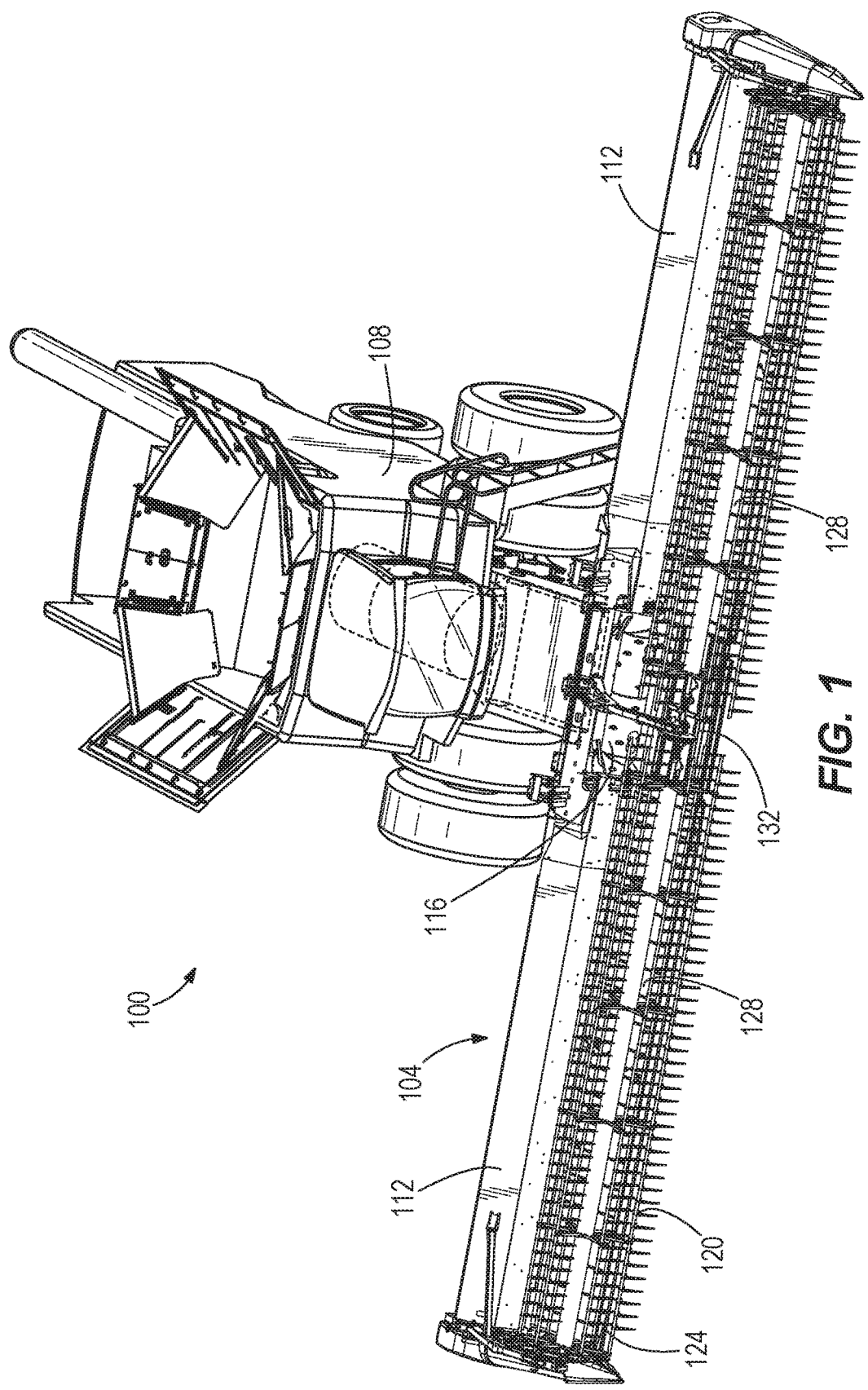
FIG. 1 is a perspective view of a combine harvester including a draper header having a float system according to one embodiment of the present disclosure.

A combine harvester 100 (or simply "combine") is shown in FIG. 1. A removable header 104 is provided at a front end of the combine 100 to cut crops and feed the crops into a housing 108, or "feeder house", of the combine 100 for further harvest processing within the combine 100 (i.e., threshing of the valued crop grains from the plant stalks and separating or cleaning the crop grains from the chaff so that the crop grains alone are harvested). The threshing and separating can be accomplished by any one of a variety of practical mechanisms. The header 104 of the illustrated construction is a flexible header in which first and second wings 112 are movably supported on opposite lateral sides of a center section 116 that attaches the header 104 to the combine housing 108. The header 104 includes a rotatable reel 120 to engage standing crops for delivery to a table of the header 104. A cutterbar 124 at a forward edge of the header 104 operates (e.g., by reciprocating a plurality of overlapping knives) to cut the crop material close to the ground as it is engaged by the reel 120. The cutterbar 124 can be a flexible unit that allows fine terrain following throughout its length. Alternately, the cutterbar 124 can be a rigid unit that remains straight within each wing 112, allowing flexure only at the joints between the wings 112 and the center section 116. The header 104 is a draper header in which the table is equipped with endless belts for feeding the cut crop material into the housing 108. For example, each wing 112 includes at least one side draper belt 128 operable to transmit the cut crop material inward toward the center section 116. The center section 116 further includes a feeder draper belt 132 operable, in a direction parallel to the combine travel direction and perpendicular to the side draper belts 128, for transmitting the cut crop material into the combine housing 108.

Figure 2:
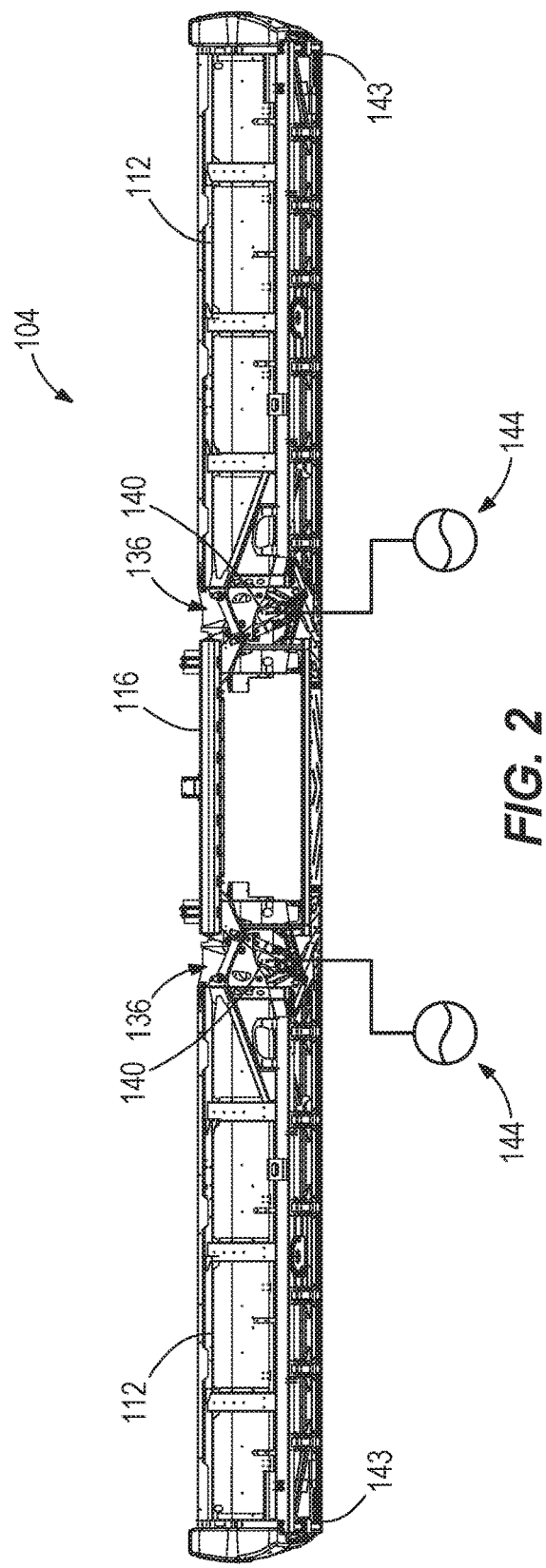
FIG. 2 is a rear view of the draper header of FIG. 1, along with schematically illustrated hydraulic float circuits connected to resilient float elements of the draper header.

Each of the wings 112 is pivotably supported by the center section 116 to allow independent movement of the two wings 112 with respect to the center section 116. In this respect, a respective connection linkage 136 is provided between the center section 116 and each wing 112, as shown in FIG. 2, to connect the same for pivoting motion. The connection linkages 136 can be provided toward a rearward end of the header 104, and a direct pivot connection may also be established toward the forward end between the center section 116 and each wing 112. The cutterbar 124, which spans both wings 112 and the center section 116 can flex to accommodate the pivoting movement of the wings 112 relative to the center section 116. This header 104 thus allows consistent low cutting of the crop material from the ground, even over uneven ground. Each wing 112 is mostly supported by a float arrangement including at least one resilient float element 140 coupled via a float linkage 142, while a small fraction of the weight of the wing 112 is applied to the ground (e.g., by a gauge wheel and/or skid 143 at the laterally outer end of the wing). Each resilient float element 140 is operable to produce a force output that varies with a position of the wing 112 with respect to the center section 116. Each of the resilient float elements 140 can be coupled in a manner that allows a relatively constant float force to be applied to the wing 112, despite changes in the actual force output of the resilient float element 140. FIG. 2 provides a general overview of the wing float system, which includes two independent float circuits or sub-systems, each of which includes the resilient float element 140 (e.g., a single-acting hydraulic cylinder). As illustrated in FIG. 2, each single-acting hydraulic cylinder is coupled via a hydraulic line to an accumulator 144 (e.g., a gas-charged accumulator) to facilitate the transfer of hydraulic fluid (e.g., liquid hydraulic oil) therebetween. The resilient float elements 140 can take other forms as well, including but not limited to one or more springs. Details of the float system and its operation are discussed in further detail below, following additional discussion of the connecting structures between the center section 116 and the wings 112.

Figure 3:
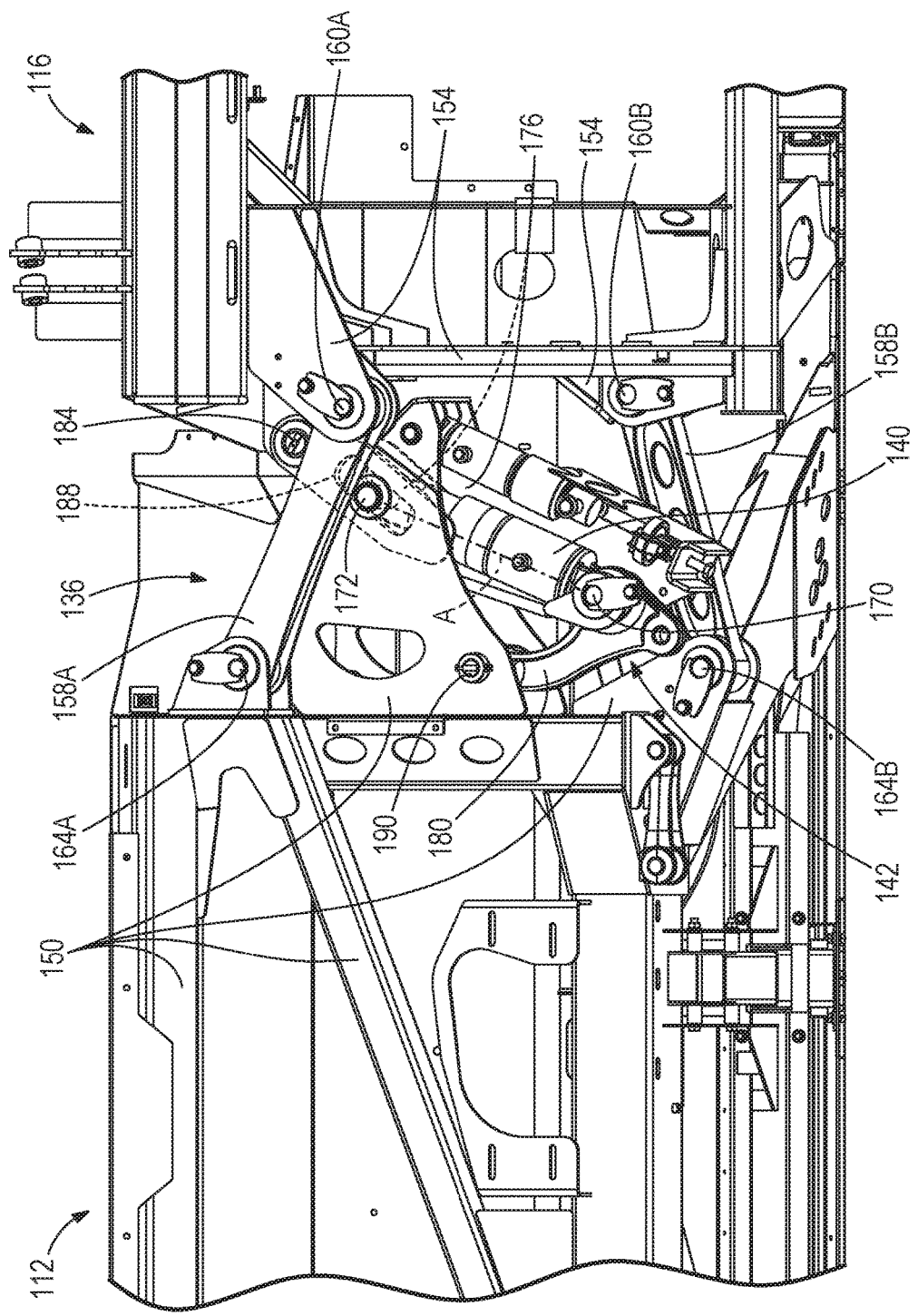
FIG. 3 is a detail view of the draper header shown in FIG. 2, further illustrating a connection linkage and a float linkage provided between a wing and a center section of the draper header. The wing is shown in a level or neutral position.
Figure 4:
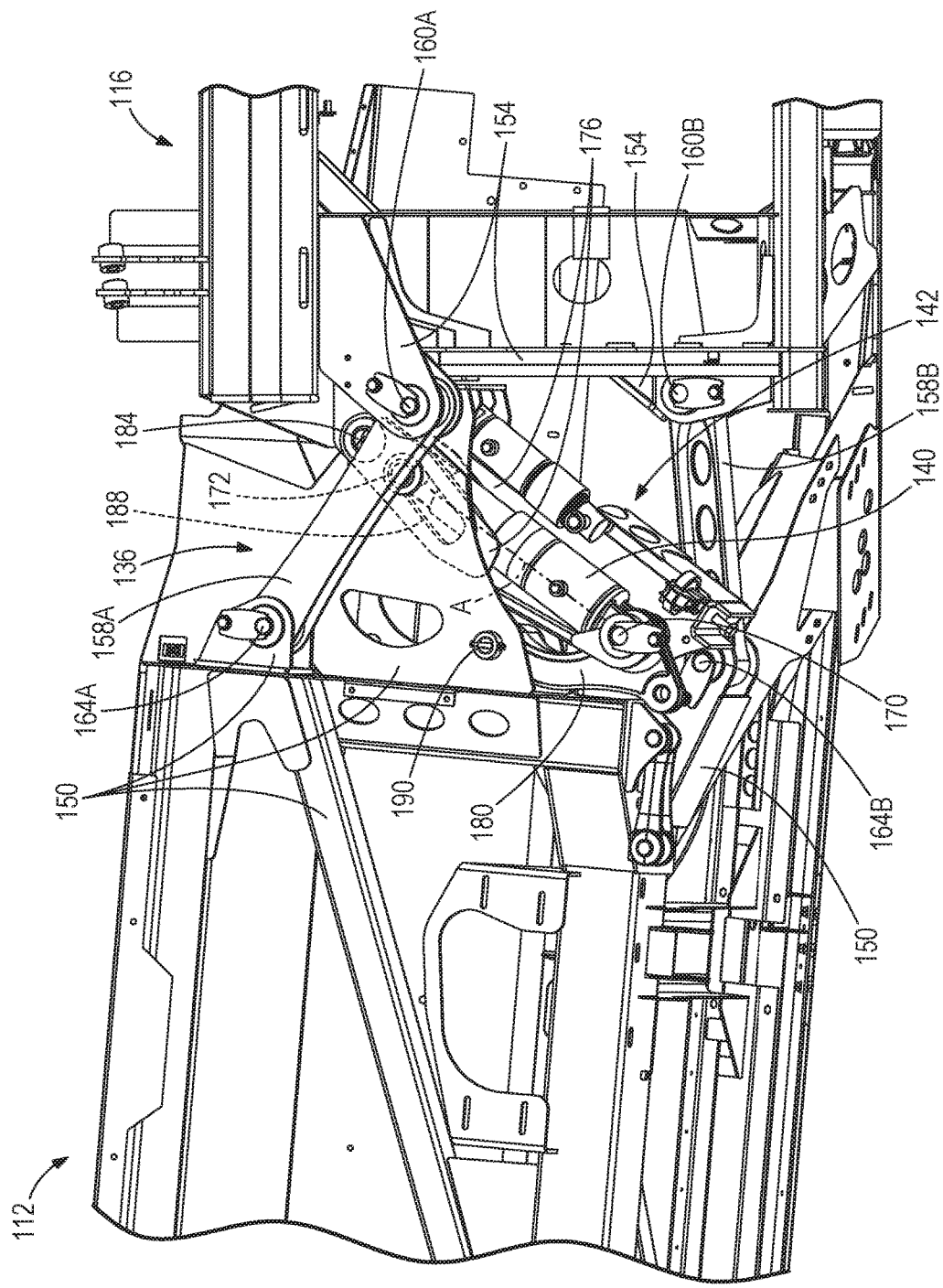
FIG. 4 is a detail view of the draper header shown in FIGS. 2 and 3, illustrating the connection linkage and the float linkage with the wing in an upwardly pivoted position.
Figure 5:
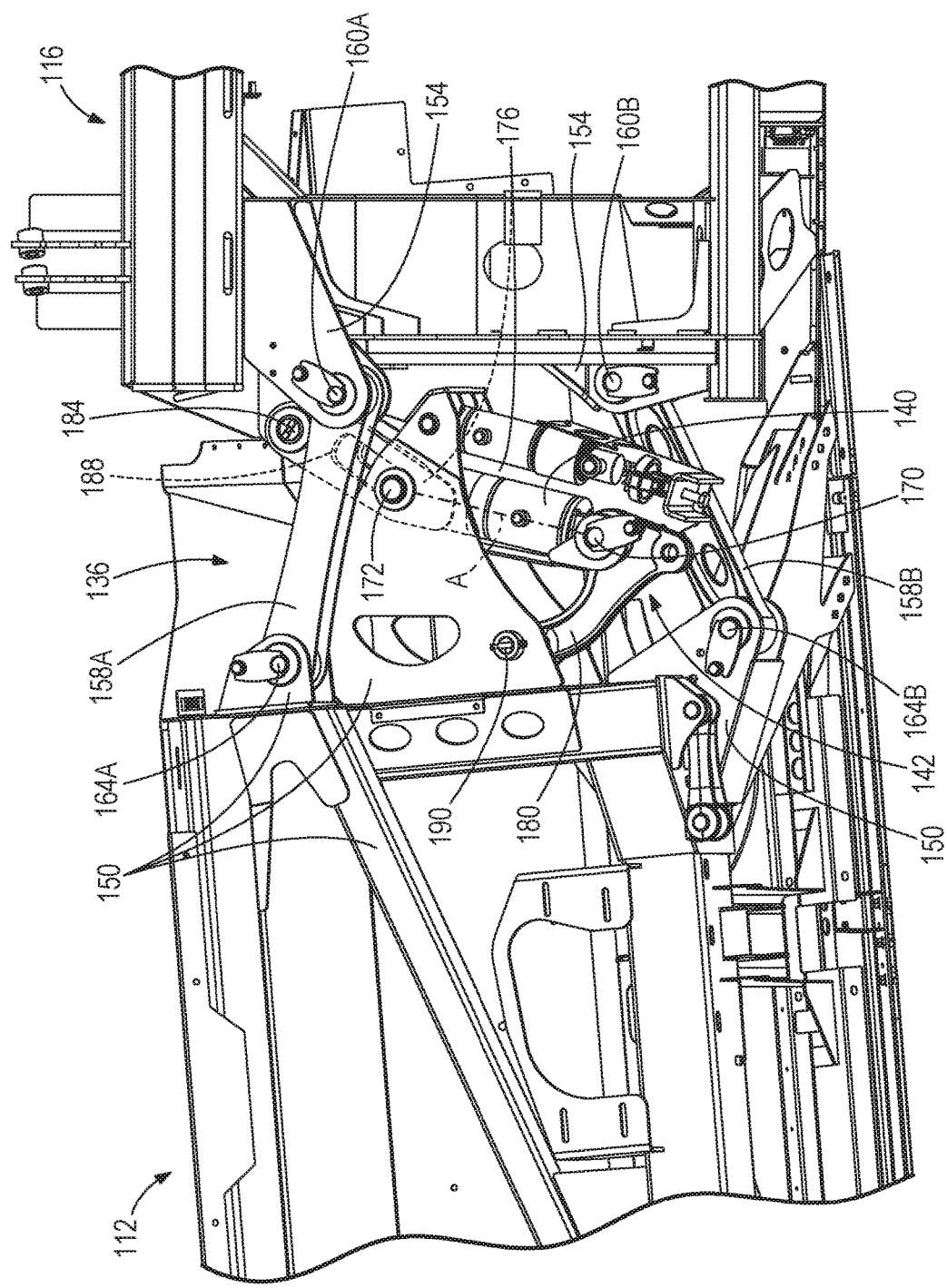
FIG. 5 is a detail view of the draper header shown in FIG. 2-4, illustrating the connection linkage and the float linkage with the wing in a downwardly pivoted position.

FIGS. 3-5 illustrate, in various operational positions, one connection linkage 136 for coupling one of the wings 112 to the center section 116, with the understanding that the other wing 112 is supported by another connection linkage 136, which is a mirror image of the illustrated connection linkage 136 and conforms to the same description. The connection linkage 136 is provided as a four-bar linkage consisting of a frame portion 150 of the wing 112, a frame portion 154 of the center section 116, and two connecting links 158A, 158B therebetween. The two connecting links 158A, 158B are coupled at two respective pivots 160A, 160B on the frame portion 154 of the center section 116 and coupled at two respective pivots 164A, 164B on the frame portion 150 of the wing 112. The float linkage 142 carrying the resilient float element 140 is separately coupled between the frame portions 150, 154. As will become further apparent by the following description, the float linkage 142 passively responds to movement of the wing 112 through the connection linkage 136 to modify the supporting relationship between the resilient float element 140 and the wing 112. By passive, it is meant that it is merely reactive or responsive in a predetermined way, rather than actively or variably controlled.

The resilient float element 140 is extensible to vary in length between a first or lower end 170 and a second or upper end 172. The first and second ends 170, 172 can be provided as pivots similar to those of the connection linkage 136, but are separate and spaced from every one of the pivots 160A, 160B, 164A, 164B of the connecting links 158A, 158B. Further, only one of the first and second ends 170, 172 of the resilient float element 140 is provided in fixed position on either of the frame portions 150, 154 (i.e., the upper end 172 is fixed on the wing frame portion 150). A primary link 176 of the float linkage 142 has a first or lower end pivotably coupled to both the first end 170 of the resilient float element 140 and a secondary link 180 of the float linkage 142. A second or upper end of the primary link 176 is pivotably coupled to an additional pivot, or third pivot 184, on the frame portion 154 of the center section 116. The third pivot 184 is spaced above and laterally outboard (to the wing side) of both of the other pivots 160A, 160B on the frame portion 154. The second end 172 of the resilient float element 140 defines a pivot joint with the frame portion 150 of the wing 112 and the primary link 176, between the first and second ends of the primary link 176 (i.e., between the pivot at the lower end 170 and the third pivot 184 on the frame portion 154). The pivot joint is retained in the illustrated construction within an elongated hole or slot 188 in which the second end 172 of the resilient float element 140, along with the frame portion 150 secured thereto, can traverse lengthwise along a distance between ends of the slot 188. The ends of the slot 188 can function as travel limits (e.g., maintaining each wing 112 in a range of +/−5 degrees from horizontal neutral alignment with the center section 116). The secondary link 180 of the float linkage 142 is pivotably coupled to the first end 170 of the resilient float element 140 and further pivotably coupled to the wing frame portion 150 at an additional pivot, or fourth pivot 190. The fourth pivot 190 lies at a position on the wing frame portion 150 between the two pivots 164A, 164B at which the two connecting links 158A, 158B are coupled.

FIG. 3 illustrates the wing 112 in a level or neutral orientation with respect to the center section 116. The upper end 172 of the resilient float element 140 is positioned approximately midway between opposing ends of the slot 188 defining the pivot joint. From this position, the wing 112 is free to pivot upwardly (FIG. 4) or downwardly (FIG. 5) in order to follow uneven ground or terrain from which crops are to be harvested. The float system, including the resilient float element 140 for each wing 112, provides passive wing floatation that responds to uneven ground conditions naturally, without monitoring or actively adjusting the resilient float element 140. Rather, when a wing 112 encounters an upslope in the ground, a ground-contact portion of the wing 112, such as the gauge wheel or skid 143, is urged upward by the ground. The float system responds automatically to this disturbance by allowing upward deflection of the wing 112. In the case of a hydraulic float system as illustrated, this includes an extension of the hydraulic cylinder provided as the resilient float element 140. The extension increases the fluid volume within the hydraulic cylinder and allows a transfer of additional hydraulic fluid from the associated accumulator 144 into the hydraulic cylinder. The hydraulic fluid pressure, and thus the stored energy, within the resilient float element 140 is thus reduced. However, to avoid exerting a reduced float force to the wing 112 while the wing 112 remains on the upslope, the float linkage 142 operates automatically during the wing movement to compensate for the reduction in stored energy within the resilient float element 140 in order to maintain a relatively constant float force exerted on the wing 112. In other words, the float linkage 142 adjusts the mechanical advantage of the resilient float element 140 to the wing 112 to offset the effect of the stored energy reduction therein, thus subduing a change in an overall wing float force applied to the wing by the resilient float element. As can be seen by comparing FIGS. 3 and 4, this is accomplished through the pivot joint to bring an operative axis A defined by the resilient float element 140 into closer alignment, or into alignment, with the third pivot 184 on the frame portion 154. Thus, while the stored energy in the resilient float element 140 is reduced in FIG. 4 as compared to FIG. 3, the overall float force exerted to the wing 112 can be maintained rather than varying as a dependent function of the wing position. As can be observed by comparing FIGS. 3 and 4, the adjustment of the operative axis A is influenced by the secondary link 180, which supports the first end 170 of the resilient float element 140 relative to the wing frame portion 150. The adjustment of the mechanical advantage is continuous through the movement of the wing 112 and has an effect on the overall wing float force that is equal and opposite to the effect of change in the stored energy within the resilient float element.

In continued operation of the draper header 100, the wing 112 may encounter a downslope. From the upwardly pivoted position of FIG. 4, the wing 112 may pivot back to level or, if the downslope in the area of the wing 112 is such that the ground level is below that of the center section 116, may pivot past level to a downwardly pivoted position such as that of FIG. 5. As the wing 112 encounters the downslope, the float system responds automatically to this disturbance by allowing downward deflection of the wing 112 as the ground reaction force resulting from the applied float force tends to decrease. In the case of a hydraulic float system as illustrated, this results in retraction or compression of the resilient float actuator 140. The hydraulic fluid pressure, and thus the stored energy, within the resilient float element 140 is thus increased. However, to avoid exerting an increased float force to the wing 112 while the wing 112 remains on the downslope, the float linkage 142 operates automatically during the wing movement to compensate for the increase in stored energy within the resilient float element 140 in order to maintain a relatively constant float force exerted on the wing 112. In other words, the float linkage 142 adjusts the mechanical advantage of the resilient float element 140 to the wing 112 to offset the effect of the stored energy increase therein, thus subduing a change in an overall wing float force applied to the wing by the resilient float element. As can be seen by comparing FIG. 4 to FIG. 3, and also FIG. 3 to FIG. 5, this is accomplished through the pivot joint to move the operative axis A of the resilient float element 140 out of alignment, and increasingly further from alignment, with the third pivot 184 on the frame portion 154. Thus, while the stored energy in the resilient float element 140 is continuously increased from FIG. 4 to FIG. 3 and to FIG. 5, the overall float force exerted to the wing 112 can be maintained rather than varying as a dependent function of the wing position. As mentioned above, the adjustment of the operative axis A is influenced by the secondary link 180, which supports the first end 170 of the resilient float element 140 relative to the wing frame portion 150. The adjustment of the mechanical advantage is continuous through the movement of the wing 112 and has an effect on the overall wing float force that is equal and opposite to the effect of change in the stored energy within the resilient float element.

In accordance with the above disclosure, it will be apparent that the float force on either wing 112 is normalized throughout its pivoting movement, without a requirement for active sensing or control through outside influences or actuators. Normalization of the float force occurs naturally through the movement of the float linkage 142 that varies the effectiveness of the resilient float element 140 to support the wing 112. As disclosed, the slot 188 provides adjustment of the mechanical advantage of the resilient float element 140 in a continuous or infinite manner within its operating range. Through its design, the resilient float linkage 142 provides a means for removing the float force dependence on wing position, without complicating the basic operation of the passive resilient float element 140, which itself still generates forces that are dependent on wing position.

Various features and advantages are set forth in the following claims.

What is claimed is:

1. A draper header for a combine, the draper header comprising:
    a center section adapted for attachment to a combine and provided with a belt operable in a rearward direction for feeding crop material into the combine;
    first and second wings extending in opposite lateral directions from the center section, each of the first and second wings comprising a draper belt operable to feed crop material toward the center section, wherein the first and second wings are individually pivotably supported relative to the center section; and
    a cutterbar positioned at a forward edge of the draper header across the center section and the first and second wings, the cutterbar operable to reciprocate for cutting crop material from the ground,
    wherein the first and second wings are coupled to the center section by respective connection linkages and are furthermore supported relative to the center section by respective resilient float elements, each resilient float element operable to produce a force output that varies with a position of the wing with respect to the center section,
    wherein each resilient float element is coupled between the center section and the respective one of the first and second wings by a respective float linkage operable through a range of positions to vary a mechanical advantage between the resilient float element and the respective wing, and
    wherein the movement of the float linkage reduces the mechanical advantage as the force output in the corresponding resilient float element increases, and the movement of the float linkage increases the mechanical advantage as the force output in the corresponding resilient float element decreases so that change of an overall wing float force applied to the wing by the resilient float element is subdued.

2. The draper header of claim 1, wherein each of the resilient float elements includes a single-acting hydraulic cylinder coupled to a gas-charged accumulator.

3. The draper header of claim 1, wherein each respective connection linkage is provided as a four-bar linkage consisting of a frame portion of the wing, a frame portion of the center section, and two connecting links therebetween.

4. The draper header of claim 3, wherein the two connecting links are coupled at two pivots on the frame portion of the center section.

5. The draper header of claim 4, wherein a primary link of each respective float linkage has a first end pivotably coupled to both a first end of the resilient float element and a secondary link of the float linkage, and a second end of the primary link is pivotably coupled to a third pivot on the frame portion of the center section.

6. The draper header of claim 5, wherein a second end of the resilient float element defines a pivot joint with the frame portion of the wing, and the pivot joint is constrained within a slot provided in the primary link between the first and second ends.

7. The draper header of claim 6, wherein the movement of the float linkage increases the mechanical advantage by bringing the pivot joint closer to alignment between the first and second ends of the float linkage primary link.

8. The draper header of claim 5, wherein the secondary link of the float linkage is pivotably coupled to the frame portion of the wing at a position between two pivots at which the two connecting links are coupled to the frame portion of the wing.

9. The draper header of claim 1, wherein the respective float linkages and the respective resilient float elements are passive, the operation of which is dictated by the position of the respective one of the first and second wings with respect to the center section.

10. A draper header for a combine, the draper header comprising:
a center section adapted for attachment to a combine and provided with a belt operable in a rearward direction for feeding crop material into the combine;
first and second wings extending in opposite lateral directions from the center section, each of the first and second wings comprising a draper belt operable to feed crop material toward the center section, wherein the first and second wings are individually pivotably supported relative to the center section;
a cutterbar positioned at a forward edge of the draper header across the center section and the first and second wings, the cutterbar operable to reciprocate for cutting crop material from the ground;
a first resilient float element operable to produce a force output from stored energy therein that is applied through a first float linkage to provide an overall float force to the first wing; and
a second resilient float element operable to produce a force output from stored energy therein that is applied through a second float linkage to provide an overall float force to the second wing,
wherein the first float linkage is operable through a range of positions to alter a mechanical advantage between the first resilient float element and the first wing inversely with a change in the force output from the first resilient float element as the first wing moves with respect to the center section, and
wherein the second float linkage is operable through a range of positions to alter a mechanical advantage between the second resilient float element and the second wing inversely with a change in the force output from the second resilient float element as the second wing moves with respect to the center section.

11. The draper header of claim 10, further comprising
a first connection linkage, separate from the first float linkage, coupling the first wing to a first side of the center section; and
a second connection linkage, separate from the second float linkage, coupling the second wing to a second side of the center section.

12. The draper header of claim 11, wherein each of the first and second connection linkages is provided as a four-bar linkage consisting of a frame portion of the wing, a frame portion of the center section, and two connecting links therebetween.

13. The draper header of claim 10, wherein each of the first and second resilient float elements includes a single-acting hydraulic cylinder coupled to a gas-charged accumulator.

14. The draper header of claim 10, wherein each of the first and second float linkages includes a primary link having a first end pivotably coupled to both a first end of the resilient float element and a secondary link of the respective float linkage, the primary link further having a second end pivotably coupled to a pivot on the frame portion of the center section.

15. The draper header of claim 14, wherein, in each of the first and second float linkages, a second end of the resilient float element defines a pivot joint with the frame portion of the wing, and the pivot joint is constrained within a slot provided in the primary link between the first and second ends.

16. The draper header of claim 15, wherein, in each of the first and second float linkages, movement of the float linkage responsive to movement of the wing with respect to the center section increases the mechanical advantage of the resilient float element by bringing the pivot joint closer to alignment between the first and second ends of the primary link.

17. The draper header of claim 14, wherein, in each of the first and second float linkages, the secondary link of the float linkage is pivotably coupled to the wing at a position between two pivots at which two connecting links are coupled to the wing, the two connecting links, along with the wing and the center section, forming a connection linkage separate from the float linkage.

18. The draper header of claim 10, wherein the respective float linkages and the respective resilient float elements are passive, the operation of which is dictated by the position of the respective one of the first and second wings with respect to the center section.

19. A method of floating a wing of a combine draper header from a center section of the draper header, the method comprising:
movably supporting the wing with respect to the center section to enable movement of the wing between a first position and a second position;
supporting the wing with respect to the center section with a resilient float element;
storing increasing amounts of energy in the resilient float element through movement of the wing from the first position to the second position; and
re-orienting the resilient float element with a float linkage to reduce the mechanical advantage of the resilient float element for supporting the wing through movement of the wing from the first position to the second position, thus buffering the wing from a force increase from the resilient float element.

20. The method of claim 19, further comprising:

releasing stored energy from the resilient float element through movement of the wing from the second position to the first position; and re-orienting the resilient float element with a float linkage to increase the mechanical advantage of the resilient float element for supporting the wing through movement of the wing from the second position to the first position, thus buffering the wing from a force decrease from the resilient float element.

\* \* \* \* \*